H. C. JONES.
CAMERA APPARATUS.
APPLICATION FILED FEB. 1, 1912.
1,055,539.
Patented Mar. 11, 1913.
2 SHEETS—SHEET 1.
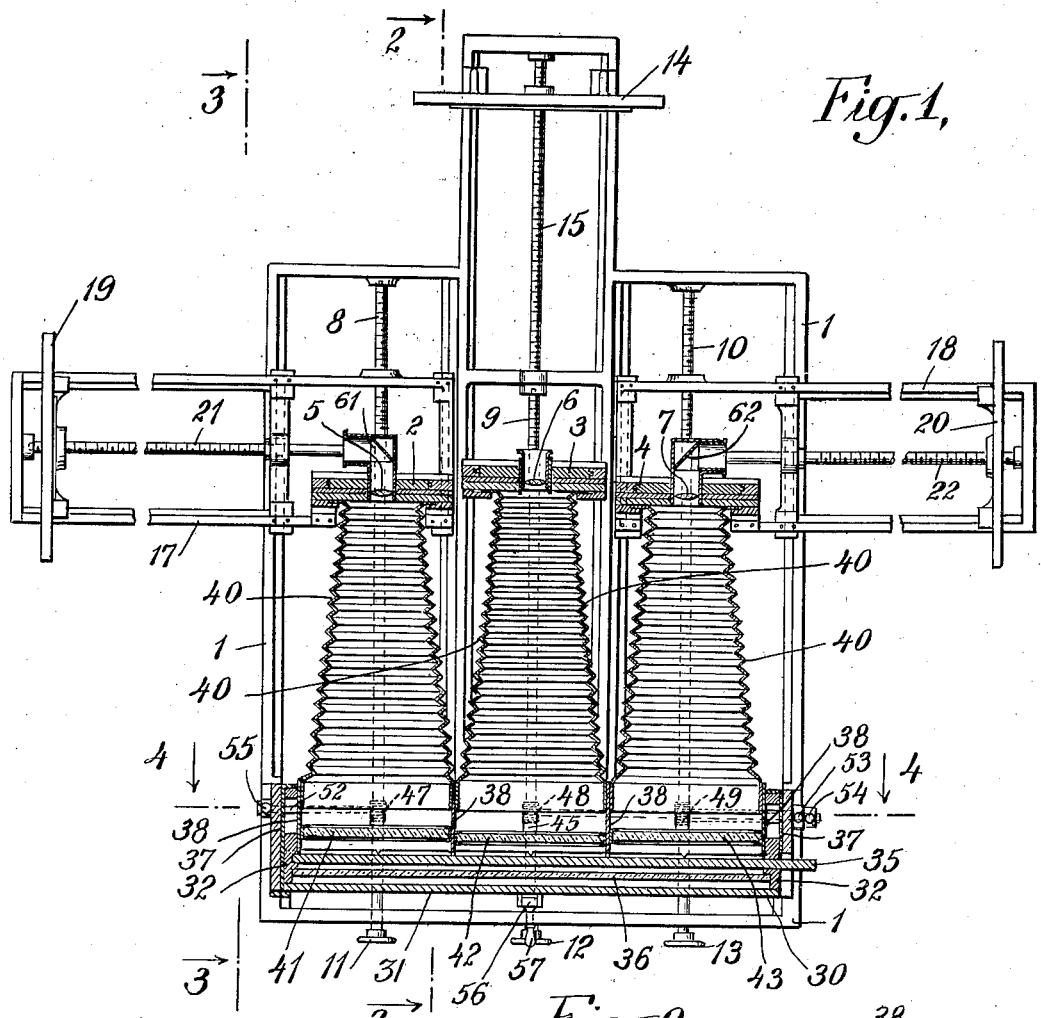
Fig. 1,
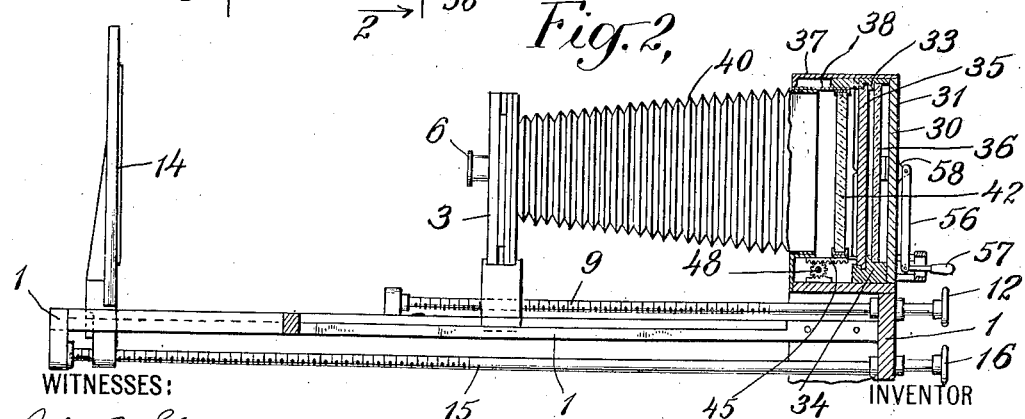
Fig. 2,
WITNESSES:
John O. Gempler
Gedmo Davis
INVENTOR
Harry C. Jones
BY
Kenyon & Kenyon
ATTORNEYS H. C. JONES.
CAMERA APPARATUS.
APPLICATION FILED FEB. 1, 1912.
1,055,539.
Patented Mar. 11, 1913.
2 SHEETS—SHEET 2.
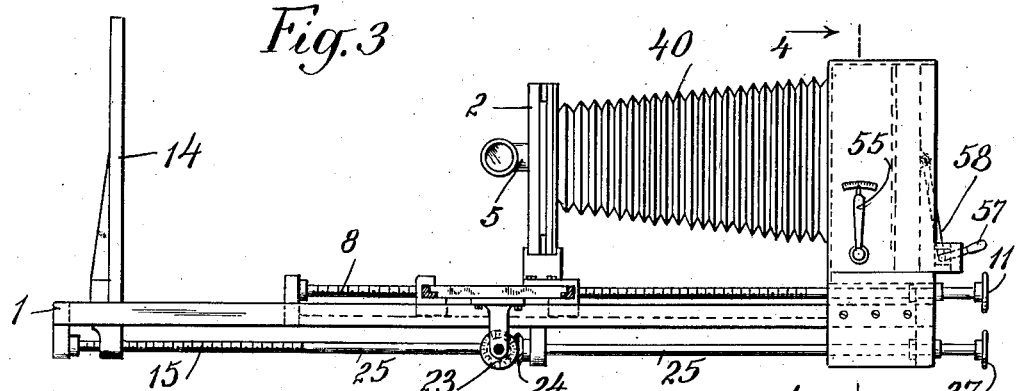
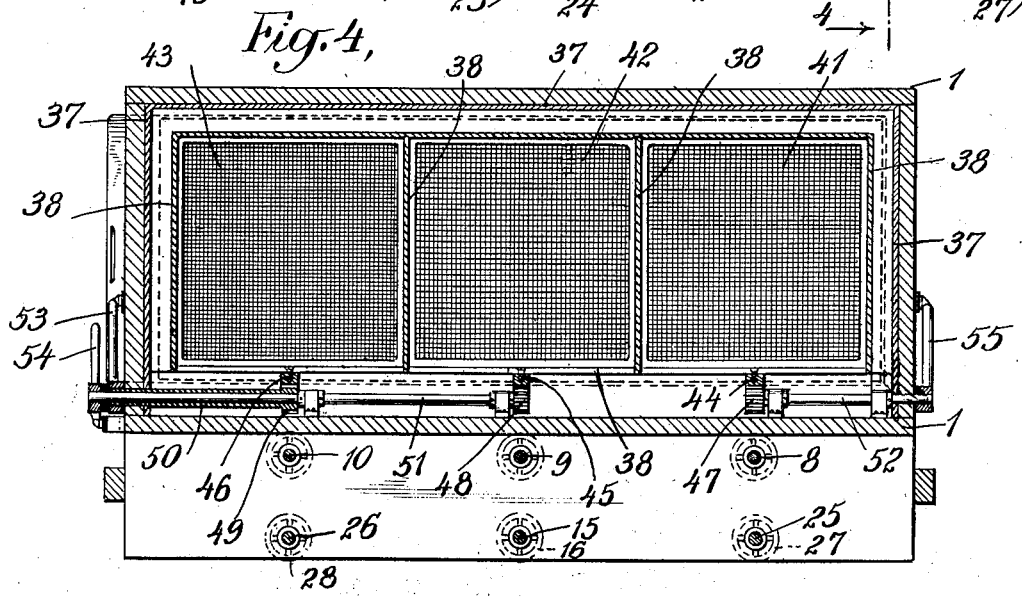
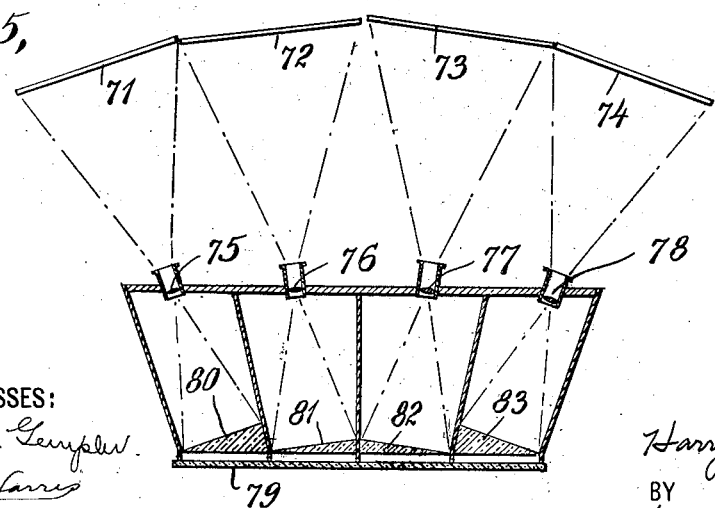
WITNESSES:
John O. Templer
Geo. M. Harris
INVENTOR
Harry C. Jones
BY
Kenyon & Kenyon
ATTORNEYS

UNITED STATES PATENT OFFICE.

HARRY C. JONES, OF LARCHMONT, NEW YORK.

CAMERA APPARATUS.

1,055,539.     Specification of Letters Patent.     Patented Mar. 11, 1913.

Application filed February 1, 1912. Serial No. 674,788.

*To all whom it may concern:*

Be it known that I, HARRY C. JONES, a citizen of the United States, and a resident of Larchmont, Westchester county, New York, have invented certain new and useful Improvements in Camera Apparatus, of which the following is a specification.

My invention relates to improvements in cameras, and I have especially designed my improvements with respect to a camera such as is used in the making of line negatives or half-tones.

One object of my invention is to provide an improved apparatus by means of which space on negatives or any form of plate may be saved and more economically used, in which the time necessary to produce a given number of half-tones or plates may be greatly decreased, and in which the amount of handling and materials used may be decreased and made more economical.

A further object of my invention is to provide an apparatus in which ample space is given for a plurality of objects, and so arranged that they may be photographed in rapid succession.

A further object of my invention is to provide a single plate holder for a single sensitized plate and a plurality of lenses co-operating therewith, each independently focusable with respect to the plate and adapted to produce independent images on the plate at different parts thereof, and to provide independent screens for each image and means for independently adjusting them toward and from the plate, and also to provide means whereby the plate may be moved with respect to the partitions so as to prevent the passage of light from one section of the plate to another.

Further objects, features and advantages will more clearly appear from the detailed description given below taken in connection with the accompanying drawings which form a part of this specification.

In the drawings, Figure 1 is a top plan view partly in section showing an apparatus embodying my improvements in one form. Fig. 2 is a vertical section taken on the line 2—2 of Fig. 1. Fig. 3 is a vertical section taken on the line 3—3 of Fig. 1. Fig. 4 is a vertical section taken on the line 4—4 of Fig. 1. Fig. 5 is a diagram illustrating certain of my improvements embodied in modified form.

Referring to Figs. 1 to 4 inclusive, 1 represents a suitable framework upon which are slidably mounted three independently movable lens carrying heads 2, 3 and 4. These lens carrying heads carry respectively lenses 5, 6 and 7. The lens carrying heads are movable horizontally by means of screw shafts 8, 9 and 10, respectively, by means of hand wheels 11, 12 and 13, in order to properly focus the lenses independently of one another. The frame 1 carries a slidably mounted object holder 14, which is adjusted at different distances from the lens 6 by means of a screw shaft 15, operated by a hand wheel 16. Rigidly connected with the lens carrying heads 2 and 4 are slidably mounted frames 17 and 18, upon which are slidably mounted object holders 19 and 20, adapted to move in a horizontal direction but at right angles to the direction in which the object holder 14 moves.

The object holders 19 and 20 are moved by means of screw shafts 21 and 22 respectively, which screw shafts are provided on their inner ends with bevel gears 23 meshing with bevel gears 24, splined to shafts 25 and 26, operated by hand wheels 27 and 28 respectively. It will thus be seen that the bevel gears 23 and 24 are carried by the frames 17 and 18, so that they are always in mesh no matter what position the frames 17 and 18 occupy with respect to the frame 1. The lenses 5, 6 and 7 may be adjusted to different positions in the lens carrying heads 2, 3 and 4, in any well known or suitable manner.

30 represents a suitable plate holder provided with a back 31, side pieces 32, top and bottom pieces 33 and 34, and a front slide 35. The plate holder is adapted to contain a single sensitized plate 36 placed therein in any well known manner. The plate holder 30 is adapted to have the front edges of the sides 32 and of the top 33 slide between members 37 and 38 which are rigid with the frame 1, thus forming a light tight joint between the plate holder and the frame, when the plate holder is placed in position, as shown in the drawings. The members 38 form partitions for determining the area exposed by each of the lenses 5, 6 and 7 respectively. The partitions 38 are connected with the lens carrying heads 2, 3 and 4 by means of collapsible walls 40, in any well known or suitable manner.

Slidably mounted within the spaces formed by the partitions 38 are three screens 41, 42 and 43, one for each lens. These screens are preferably glass plates suitably etched with lines crossing one another in order to form the necessary lines on the negative or other plate operated upon. These screens are carried rigidly with racks 44, 45 and 46, which are moved by means of gears 47, 48 and 49, respectively. The gears 47, 48 and 49 are rigidly connected with shafts 50, 51 and 52, which are provided at their outer ends with handles 53, 54 and 55, so that any one of the screens 41, 42 or 43 may be moved toward the plate 36 independently, and properly adjusted with respect thereto. After the slide 35 has been withdrawn from the plate holding means the holder 30 and the plate 36 may be moved forward, the top, and sides of the plate holder sliding between the members 37 and 38, as above explained. In order to force the plate holder and plate forward I provide a bell crank lever 56, with a handle 57, adapted to operate upon the back of the plate holder at 58, so that upon lifting the handle 57 the plate and plate holder are forced inwardly, as shown in dotted lines in Fig. 3, thus bringing the plate 36 into close proximity with the front edges of the partitions 38, so that there is no danger of any light leaking around these partitions so as to strike one section or part of the plate when another part is being exposed.

In order that the objects placed upon the object holders 19 and 20 may have images thereof properly produced upon the plate 36 by means of the lenses 5 and 7, I provide prisms 61 and 62 adjacent the lenses 5 and 7, so that the light rays passing from the objects, at 19 and 20, are deflected through the lenses 5 and 7 so as to produce images thereof upon the plate, through the screens 41 and 43. Any well known means may be substituted for the prisms 61 and 62, which will properly change the direction of the light rays. Thus it will be seen that I provide for one or more of the lenses means for deviating or bending the axial line of light of the lens whereby objects placed at 19 and 20 may have their images produced at the proper places on the plate 36. It is not necessary that the axial line of the lens or lenses be bent at right angles, since any suitable angle may be used. It is important, however, that the axial line of one or more of the lenses be deviated, as explained, in order that large objects may be simultaneously focused on the holders 14, 19 and 20, without interfering with one another. By thus distributing the object holders 14, 19 and 20 in different directions and providing means for deviating the axial line of rays from the objects to the lens the objects are better accommodated.

It will thus be seen that I have provided an improved form of apparatus by means of which a plurality of objects may be set up and adjusted for photographing each independently of the other, and each may be independently focused with respect to a single sensitized plate. That is, a number of objects may be preliminarily focused and then rapidly exposed, one after the other, upon different portions of the same sensitized plate. By this arrangement a number of negatives or images may be developed by a single operation.

It often happens that the size of each image which it is desired to produce is comparatively small, and since for convenient handling it is necessary to have a plate of a size much larger than is necessary to accommodate such small images, in the ordinary form of apparatus a great deal of this plate is wasted as well as materials with which it is developed, so that by exposing a number of images on different portions of the plate not only is the whole area of the plate economically used but a number of half-tones or images are all produced by one single operation, which in old forms of devices it took a correspondingly large number of operations to produce. In the use of wet plates in such cameras, it is important that the plate be developed within a short space of time after being put in the camera, so that all of the exposures must be made within a reasonably short time. My apparatus is especially adapted to accomplish this result, since all of the various objects may be previously focused and properly positioned before the plate is put into the camera, and then the plate may be quickly put in the camera and the various objects exposed, one after the other, in quick succession, or simultaneously, so that the plate only needs to be in the camera a very short space of time, and time does not have to be wasted to focus one object after another has been exposed, and so on.

Referring to Fig. 5, I there show a diagram merely illustrating certain of my improvements in a modified form. I there show four objects 71, 72, 73 and 74, adapted to coöperate with independent lenses 75, 76, 77 and 78, which produce corresponding images upon a single sensitized plate 79. It will be noticed that the objects 71 to 74 inclusive, are distributed about in different directions in order that more space may be had for the objects, and yet the rays from them are properly concentrated upon a smaller space on the plate 79. In order to deviate the rays or the axial line of rays from the objects 71 and 72, 73 and 74, so as to cause the rays to properly strike the plate 79, I provide prisms 80, 81, 82 and 83 in the path of the rays in the front of the plate 79. The arrangement shown in Fig. 5 is not a preferred form, but merely illustrates one method of deviating or bending the rays so that the axial line of rays from the object is bent in order to better accommodate the objects.

Although I have described my improvements in great detail and with respect to certain particular embodiments thereof, nevertheless I do not desire to be limited to such details except as clearly specified in the appended claims, since many changes and modifications may well be made without departing from the spirit and scope of my invention in its broadest aspects.

Having fully and clearly described my improvements, what I claim as new and desire to secure by Letters Patent, is:

1. Camera apparatus having in combination, means for holding a single sensitized plate, a plurality of object holders and a corresponding plurality of lenses for producing corresponding images, and means whereby each of said lenses may be independently focused with respect to the single sensitized plate.

2. Camera apparatus having a holder, for sensitized plates, a plurality of independently focusable lenses coöperating with said holder, and a corresponding plurality of independently movable object holders, one for each lens.

3. A camera having holding means for a single sensitized plate, and a plurality of independently focusable lenses placed to produce images on different parts of said plate.

4. Camera apparatus having a holder for a single sensitized plate, a plurality of independently focusable lenses for producing independent images on different parts of said plate, and a plurality of object holders one for each lens, and each independently movable toward and from its lens.

5. In a camera, the combination of a plate holder, a plurality of lenses for producing images in different positions with respect to the plate holder, and means whereby each of said lenses may be independently focused with respect to the plate holder.

6. In a camera, the combination of a means for holding a single sensitized plate, a plurality of lenses for producing independent images on different parts of the plate, and means whereby the axial line of light of one or more of the lenses, may be deviated or bent.

7. In a camera, the combination of a plate holding means, a plurality of independently focusable lenses, and means whereby the axial line of light of one or more of the lenses may be deviated or bent to better accommodate different objects.

8. In a camera apparatus, the combination of a single plate holder, a plurality of lenses for producing independent images in different positions with respect to the plate holder, means for independently focusing each lens, a plurality of independently movable object holders one for each lens, and means for deviating or bending the axial line of light of one or more of said lenses.

9. In a camera apparatus, the combination of means for holding a single sensitized plate, three lenses arranged to produce independent images on independent parts of said single plate, means for independently focusing each lens, three independently movable object holders, and means for deviating or bending the axial line of light of two of said lenses between the objects and the plate.

10. In a camera apparatus, the combination of means for holding a single sensitized plate, three lenses arranged to produce independent images on independent parts of said single plate, means for independently focusing each lens, three independently movable object holders, three screens, one in front of each image on the plate, means whereby each screen may be independently adjusted toward and from the plate, and means for deviating or bending the axial line of light of two of said lenses between the objects and the plate.

11. In a camera, a plate holder, a plurality of independently focusable lenses for producing images in different positions with respect to the plate holder and a separate screen in front of each image.

12. In a camera, a plate holder, a plurality of independently focusable lenses for producing images in different positions with respect to the plate holder, and a separate screen in front of each image, and means for independently moving each screen toward and from the plate holder.

13. In a camera apparatus, means for holding a single sensitized plate, a plurality of lenses placed to produce independent images in different positions on said plate, a corresponding plurality of independently movable object holders, and means for deviating or bending the axial line of light of one or more of the lenses to better accommodate the objects.

14. In a camera apparatus, means for holding a single sensitized plate, a plurality of lenses placed to produce independent images in different positions on said plate, a corresponding plurality of independently movable object holders, means for deviating or bending the axial line of light of one or more of the lenses to better accommodate the objects, and a plurality of independently movable screens, one in front of each image.

15. In a camera apparatus, the combination of a plate holder, a plurality of independently focusable lenses placed to produce independent images in independent positions with respect to the plate holder, a corresponding plurality of independently movable object holders, and a corresponding plurality of independently movable screens, one in front of each image.

16. In a camera apparatus, the combination of a single plate holder, a plurality of independently focusable lenses for producing independent images with respect to said plate holder, a plurality of independently movable object holders for holding the objects, images of which are produced by the lenses, and means for deviating or bending the axial line of light of one or more of said lenses to better accommodate the objects.

17. In a camera, plate holding means containing a single sensitized plate, a plurality of lenses placed to produce independent images on different portions of the plate suitable partitions for determining the area of the plate exposed by each lens and means for moving the plate with respect to said partitions, to bring the plate nearer the partitions.

18. In a camera, a plate holder, a plurality of lenses coöperative therewith, adapted to produce independent images at different parts of the plate holder, suitable partitions for determining the area exposed by each lens, and means for moving the plate holder with respect to said partitions to bring the partitions nearer the plate holder.

19. In a camera, a plate holder, a plurality of lenses coöperative therewith, adapted to produce independent images at different parts of the plate holder, suitable partitions for determining the area exposed by each lens, and means for moving the plate holder with respect to said partitions to bring the partitions nearer the plate holder, an independent screen for each lens and means for independently moving each screen, with respect to the plate holder.

20. In a camera, plate holding means containing a single sensitized plate, a plurality of lenses placed to produce independent images on different portions of the plate suitable partitions for determining the area of the plate exposed by each lens and means for moving the plate with respect to said partitions, to bring the plate nearer the partitions, independent screens in front of the plate, one for each lens, and means for independently focusing each of the various lenses.

In testimony whereof, I have signed my name to this specification, in the presence of two subscribing witnesses.

HARRY C. JONES.

Witnesses:
GORHAM CROSBY,
EDWIN SEGAR.